Nov. 16, 1943.   F. W. LIVERMONT   2,334,424
PROTECTOR
Filed April 21, 1941
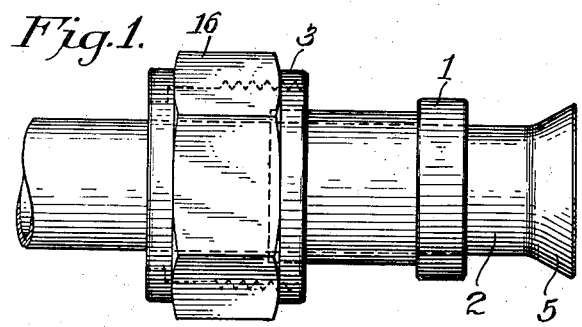
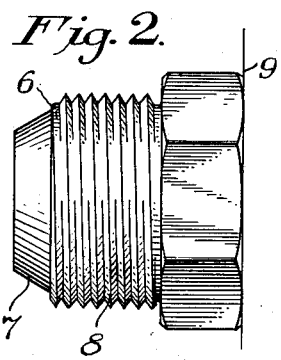
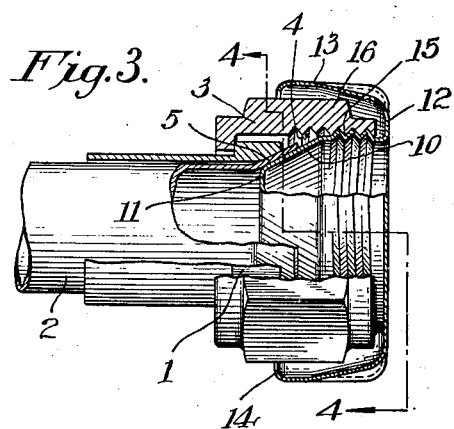
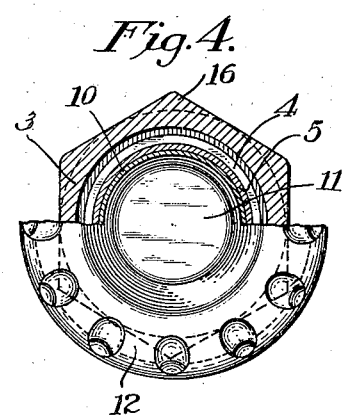
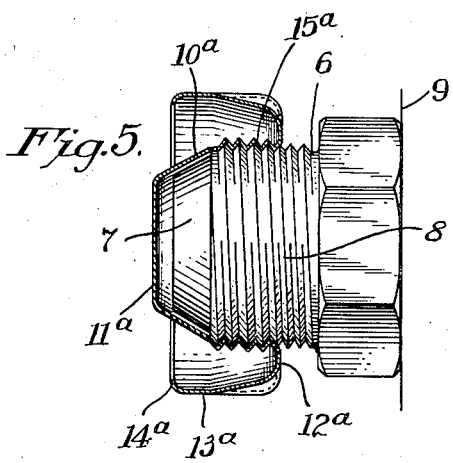
INVENTOR.
Frank W. Livermont,
BY Patented Nov. 16, 1943

2,334,424

UNITED STATES PATENT OFFICE 2,334,424

PROTECTOR

Frank W. Livermont, Glendale, Calif., assignor of one-third to Richard A. Livingston and one-third to Richard L. Ames, both of Los Angeles, Calif.

Application April 21, 1941, Serial No. 389,485

6 Claims. (Cl. 138—96)

This invention is a protector which may be readily detachably mounted on tubing and its couplings for protecting the same preparatory to assembly in a tubing system.

The invention is particularly applicable to airplane manufacture, where various parts which have been incorporated in an airplane are connected by tubing to provide conduits for oil, fuel and other fluids. In this industry it is standard practice to prepare and maintain a stock of tubing lengths, with closures at their ends, and then draw upon this stock and remove the end closures just prior to incorporating a tubing length in an airplane. The tubing length may be operatively connected to a desired part of the airplane by a coupling, one element of the coupling being usually mounted on the tubing length and the cooperating element being mounted on the airplane part.

It is an object of the invention to provide a protector for the tubing length and its coupling element, while these parts are in stock; and to also provide a protector for the cooperating coupling element of the airplane part, while the airplane part and its coupling element are in stock and while mounted in an airplane preparatory to connecting the tubing length.

It is a further object of the invention to provide a protector adapted for quick-detachable engagement with a coupling element, for protecting its coupling means until such time as the coupling element is to be connected to a cooperating coupling element in an assembled structure.

It is a further object of the invention to provide a protector for the bore of the coupling element upon which the protector is mounted.

It is a still further object of the invention to provide a protector for a tubing length, closing the ends of its bore; and more particularly to provide a protector for both a tubing length and a coupling element which may be mounted thereon.

Further objects of the invention will be readily understood from the following description of the accompanying drawing, in which:

Fig. 1 is a side elevation of a tubing length and a coupling element, prior to assembly in a tubing system.

Fig. 2 is a similar view of the cooperating coupling element of a part to which the tubing is to be connected.

Fig. 3 is a side elevation, partly in axial section, showing the protector in operative position with relation to the tubing length and the coupling element which is shown at Fig. 1.

Fig. 4 is a transverse section on the line 4—4 of Fig. 3.

Fig. 5 is a view similar to Fig. 3, showing the protector in operative position with relation to the coupling element which is shown at Fig. 2.

This invention, while generally applicable for protecting tubing and its couplings preparatory to assembling a tubing system, is particularly applicable and is therefore described as employed in airplane manufacture.

In accordance with usual construction and as shown at Fig. 1, a collar 1 is slidably mounted on a tubing length 2, with a coupling element 3 slidably mounted on the collar and provided with coupling means 4 which is preferably a female thread. The end of the tubing is outwardly flared as shown at 5, to provide an end abutment for the collar 1 which in turn forms an end abutment for the coupling element 3. Tubing and coupling element assemblies of this type are prepared in desired tubing lengths (either straight or bent as desired), and are cleaned and placed in stock until needed.

As shown at Fig. 2, a cooperating coupling element 6 has a tapering end 7 adapted for reception in the flared end 5 of the tubing length 2, and is provided with coupling means 8, shown as a male thread, adapted to engage the cooperating coupling means 4 of the coupling element 3. The coupling element 6 may be provided with coupling means 8 at its respective ends so as to provide a union for proximate lengths of tubing 2; but is preferably employed and is illustrated as mounted on a fixed part, e. g. an airplane part, with one end of the coupling element projecting as a nipple which is provided with coupling means 8. This nipple is shown projecting from an element 9 which may be an instrument panel or pump or other part of an airplane, the element 9 and its projecting nipple 6 being mounted in the airplane during course of construction, ready for connecting a tubing length 2 to the nipple.

The tubing length 2 and its coupling element 3, while in stock, are protected as shown at Fig. 3. The protector comprises a sleeve 10, closed at its forward end as shown at 11. The sleeve is outwardly flanged at its rear end as shown at 12, and then projects forwardly as a skirt 13 which is radially spaced from the sleeve 10 and terminates in an inwardly turned flange 14. The forward portion of the sleeve 10 and its closed end 11 are adapted for reception in the flaring end 5 of a tubing length 2, so as to close the bore of the same, and for this purpose the forward end of the sleeve 10 is tapered to correspond to the flare 5. The rear portion of the sleeve 10 is adapted for connection with the coupling element 3 which is mounted on the tubing length 2, e. g. by a male thread 15 on the sleeve 10 engaging the female thread 4 of the element 3. The protector is thus adapted for quick detachable mounting in operative position by means of the threaded connection 4—15, and by tightening this threaded connection the tapering end of the sleeve 10 may be seated in the flare 5 for sealing the bore of the tubing length 2.

The radially spaced skirt 13 surrounds the coupling element 3, protecting the gripping means (shown as hexagon 16) which is usually provided at the outer surface of the element 3. The skirt 13 is strengthened by its flange 14 so that it is substantially rigid, but is of material having some slight inherent resiliency whereby it acts as a shock absorber for protecting the tubing length 2 and its coupling element 3, particularly the flare 5 and the threads 4 and 15, against rough handling.

In similar manner, the flange 12 protects the end of the coupling element 3, and is of material which is substantially rigid but has some slight inherent resiliency, thereby acting as a shock absorber in the event of rough handling, to prevent injury to the tubing length 2 and its coupling element 3, particularly the flare 5 and the threads 4 and 15.

The tapering portion of the sleeve 10 and its end closure 11 are also of material having some slight inherent resiliency, as least as great and preferably greater than the tubing 2, whereby the tapering sleeve 10 may be seated against the flare 5 so as to conform exactly thereto without distorting said flare; and in the event of the protector being struck due to rough handling, it absorbs the shock and yields at its engagement with the flare 5, so as to appreciably decrease transmission of the blow to the tubing length 2.

When a length of tubing 2, protected as shown at Fig. 3, is to be withdrawn from stock and connected to a nipple 6, its protector plug is removed by unscrewing the threaded connection 4—15, thereby adapting the coupling element 3 of the tubing length for threaded engagement with the nipple 6; and the protector plug having been cast aside is protected, particularly at its threads 15, by its flange 12 and its skirt 13 so that it may be reused on a length of tubing which is in stock.

As an instance whereby the tapering closure 10—11 and its flange 12 and skirt 13 will have desired rigidity, with some slight inherent resiliency, and whereby this protector plug may be economically and rapidly manufactured, the entire protector plug is preferably stamped from relatively thin sheet metal such as cold rolled steel. The thickness of the sheet metal will depend upon the diameter of the protector plug, determined by the size of tubing with which it is to be employed, it being understood that for larger sizes of protector plugs a thicker metal is required to insure the desired rigidity with some slight inherent resiliency. By way of example, protector plugs for tubing of ½" O. D. and smaller, have been stamped from cold rolled steel of 26 gauge, Stubbs scale, and protector plugs for larger tubing up to 1" O. D., have been stamped from similar sheet metal of 24 gauge, Stubbs scale.

Protector plugs for use with tubing such as generally employed in airplane manufacture, i. e. 1" O. D. or smaller, may thus be readily manufactured by a stamping operation, and will have the desired rigidity with some slight inherent resiliency, when using ferrous metal of from say 22 to 30 gauge, Stubbs scale.

The threads 15 may be rolled threads, as is preferred practice when employing relatively thin metal such as described, the sheet metal being stamped to form the entire protector plug, with the threads 15 rolled in the sleeve 10 after or as an intermediate step of the stamping operation.

The nipple 6, before it is mounted in an airplane, and also after it is mounted in place ready to have a length of tubing 2 connected thereto, is protected as shown at Fig. 5. This protector is received over the nipple and connected to its male thread 8, for protecting the thread and closing the bore of the nipple.

As an instance, this protector cap may be similar in all respects to the protector plug previously described (with similar parts indicated by the same reference numerals with the exponent a), except that the threads 15a are formed in the bore of the sleeve 10a, and this sleeve is of diameter for reception over the nipple 6, with its tapering forward portion and its end closure 11a received over the tapering forward end of the nipple. In other words, when mounting the protector cap on the nipple 6 (Fig. 5), it is axially reversed with relation to the protector plug which is mounted on the end of tubing length 2 (Fig. 3); but provides similar protection for the bore and threads of the nipple 6, since the axially projecting closure end 11a and the radially spaced skirt 13a form axial and transverse shock absorbers, with the skirt 13a protecting the threaded portion of the sleeve 10a against distortion such as might otherwise result in its threads 15a marring the thread 8 of the nipple 6 when screwed thereon.

The invention thus provides an economical and readily manufactured protector, which may be made in sizes to form protector plugs for reception in tubing lengths 2 or protector caps for reception over nipples 6, with the protector forming an end closure for the tubing or nipple and surrounding and protecting the threads of its coupling means, and with the protector of substantially rigid material but having some slight inherent resiliency so as to provide a shock absorber for preventing damage to the tubing 2 or the coupling means 4 or 8.

I claim:

1. A protector for use with a tubing coupling comprising a sleeve fitted upon the outside of tubing and an interiorly threaded nut having a flange extending radially inwards to engage behind a flange extending radially outwards from said sleeve to draw said sleeve toward the associated end of said tubing against the outer surface of a conical flare formed thereon, said protector providing means for holding said coupling parts in assembled relation and protecting the same comprising a central hub having a cylindrical portion exteriorly threaded for engagement within said nut, a frusto-conical portion on one end of said cylindrical portion adapted to fit the interior surface of said flare on said tubing and to be pressed into sealing contact therewith when said nut is tightened on said cylindrical portion, and a head closing the smaller end of said frusto-conical portion, an annular portion extending radially outwards from the other end of said cylindrical portion of said hub, and a substantially cylindrical flange extending from said annular portion and spaced from said hub far enough to enclose said nut therebetween.

2. A closure member for use with a conduit device having a tapered seat and a coupling means, said closure member consisting of a single piece of thin, resilient material and having: a tapered seat portion adapted to fit against said tapered seat of said conduit device and a locking portion extending from said tapered seat portion and engageable with said coupling means for pressing said tapered seat portion against said tapered seat of said conduit device, said tapered seat portion of said closure member being sufficiently deformable by virtue of its thinness and the inherent resiliency of said material as to yield and conform to the shape of the tapered seat of said conduit device despite slight variations of the normal shape of said tapered seat portion from the shape of said tapered seat of said conduit device, whereby a seal between said tapered seat portion of said closure member and the tapered seat of said conduit device is insured without material deformation of the tapered seat of the conduit device.

3. A protector for a nipple having connecting means on its exterior peripheral surface, said protector consisting of a single piece of thin, resilient material having: a tubular section configured to fit over said nipple and enclose and lock to the said connecting means thereon, and an end closure wall on one end of said tubular section, the mid portion of said end closure wall extending across the end of said nipple in axially spaced relation to the end thereof when the protector is affixed to the nipple, and the material of said end wall being so thin and resilient as to deform in response to blows applied thereto as an incident to ordinary handling and thereby absorb and reduce the force of blows applied through said protector to said nipple.

4. A protector for a conduit device having a fluid passage surmounted by a coupling element, said protector consisting of a thin, resilient member having: a tubular section configured to lock to said coupling element of said conduit device; a radially extending flange section on one end of said tubular section; and a substantially cylindrical skirt section merging at one end into the outer edge of said flange section, said flange and skirt sections being so readily deformable by virtue of their thinness and inherent resilience that they deform and absorb the force of blows incident to handling instead of transmitting such forces with undiminished strength to said conduit device on which the protector is mounted.

5. A protector for use with a tubing coupling for a flared end tube, said coupling comprising an internally threaded nut element and means including a shoulder on said nut element for exerting pressure against the outer surface of the said flared end of said tube to draw said flared end against the outer surface of a cooperating coupling element, said protector providing means for holding said tube and nut in assembled relation and protecting the same and comprising: a central hub having a cylindrical portion bearing threads for engagement with said nut; a tapered portion on one end of said cylindrical portion adapted to fit the interior surface of said flare on said tubing and to be pressed into contact therewith when said nut is screwed onto said cylindrical portion; an annular portion extending radially outwards from the other end of said cylindrical portion of said hub; and a substantially cylindrical flange extending from said annular portion and spaced from said hub far enough to enclose said nut therebetween, said cylindrical flange being so thin and of material having such inherent resilience as to be crushed into engagement with the outer surface of said nut and its rotation relative to said nut thereby prevented if attempt is made to excessively tighten said protector by application of a wrench to said cylindrical portion thereof.

6. In combination with a tubing coupling comprising a sleeve fitted upon the outside of tubing and an interiorly threaded nut having a flange extending radially inwards to engage behind a flange extending radially outwards from said sleeve to draw said sleeve toward the associated end of said tubing against the outer surface of a conical flare formed thereon, a tubing and coupling protector comprising a central hub comprising a cylindrical portion exteriorly threaded for engagement within said nut, a frusto-conical portion on one end of said cylindrical portion fitted to the interior surface of said flare on said tubing and adapted to be pressed into sealing contact therewith when said nut is tightened on said cylindrical portion, a head closing the smaller end of said frusto-conical portion, an annular portion extending radially outwards from the other end of said cylindrical flange extending from said annular portion and spaced from said hub far enough to enclose said nut therebetween.

FRANK W. LIVERMONT.